(12) United States Patent
Lukacsel

(10) Patent No.: US 10,305,349 B2
(45) Date of Patent: May 28, 2019

(54) ACTUATOR WITH LATCHING CONNECTION

(71) Applicant: Continental Automotive GmbH, Hannover (DE)

(72) Inventor: Mihai Lukacsel, Deva (RO)

(73) Assignee: Continental Automotive GmbH, Hannover (DE)

( * ) Notice: Subject to any disclaimer, the term of this patent is extended or adjusted under 35 U.S.C. 154(b) by 243 days.

(21) Appl. No.: 15/101,107

(22) PCT Filed: Nov. 24, 2014

(86) PCT No.: PCT/EP2014/075351
§ 371 (c)(1),
(2) Date: Jun. 2, 2016

(87) PCT Pub. No.: WO2015/082238
PCT Pub. Date: Jun. 11, 2015

(65) Prior Publication Data
US 2016/0301283 A1   Oct. 13, 2016

(30) Foreign Application Priority Data

Dec. 5, 2013  (EP) .................................... 13464020

(51) Int. Cl.
| | |
|---|---|
| *H02K 5/10* | (2006.01) |
| *H02K 7/10* | (2006.01) |
| *H02K 7/116* | (2006.01) |
| *F16H 57/031* | (2012.01) |
| *H02K 5/22* | (2006.01) |

(52) U.S. Cl.
CPC ............ *H02K 7/116* (2013.01); *F16H 57/031* (2013.01); *H02K 5/10* (2013.01); *H02K 5/22* (2013.01)

(58) Field of Classification Search
CPC ............ H02K 5/10; H02K 5/116; H02K 7/116
USPC ....................................................... 310/83, 89
See application file for complete search history.

(56) References Cited

U.S. PATENT DOCUMENTS

| | | | |
|---|---|---|---|
| 2,600,697 A | 6/1952 | Schmitter | |
| 9,188,214 B2 | 11/2015 | Suto et al. | |
| 2006/0213318 A1* | 9/2006 | Hibbler | B60K 17/16 74/607 |
| 2013/0220073 A1* | 8/2013 | Suto | F16H 1/16 74/606 R |

FOREIGN PATENT DOCUMENTS

| | | |
|---|---|---|
| CN | 103180638 | 6/2013 |
| DE | 1919444 U | 7/1965 |
| DE | 1919444 U | 7/1965 |
| DE | 1919444 A1 | 9/1970 |
| FR | 1454998 | 10/1966 |
| JP | S 58-84430 U | 6/1983 |

(Continued)

*Primary Examiner* — Thomas Truong
(74) *Attorney, Agent, or Firm* — Cozen O'Connor

(57) ABSTRACT

An actuator includes: a housing, an electric motor arranged in a chamber of the housing, and a gear mechanism, which is connected, on the input side, to a shaft of the electric motor and, on the output side, to a control element. The gear mechanism is arranged in a second chamber of the housing and the second chamber is closed by a round cover. The second chamber has a round cross-section and is closed by the round cover.

5 Claims, 3 Drawing Sheets

(56) References Cited

FOREIGN PATENT DOCUMENTS

| | | |
|---|---|---|
| JP | S 62-126840 | 6/1987 |
| JP | 2002-044909 | 2/2002 |
| JP | 2006-275289 | 10/2006 |
| JP | 2010-045954 | 2/2010 |
| JP | 2012-042034 | 3/2012 |
| JP | 2012062981 A | 3/2012 |
| JP | WO 2012026430 A1 * | 3/2012 ............... F16H 1/16 |
| JP | 05-033541 | 9/2012 |

* cited by examiner

ACTUATOR WITH LATCHING CONNECTION

CROSS-REFERENCE TO RELATED APPLICATIONS

This is a U.S. national stage of application No. PCT/EP2014/075351, filed on 24 Nov. 2014, which claims priority to the Europe Application No. EP 13464020 filed 5 Dec. 2013, the content of both incorporated herein by reference.

BACKGROUND OF THE INVENTION

1. Field of the Invention

The present invention relates to an actuator having a housing, an electric motor arranged in a chamber of the housing, and a gear mechanism connected on the input side to the shaft of the electric motor and on the output side to an actuating member, the gear mechanism being arranged in a second chamber of the housing, which second chamber is closed by a cover.

2. Related Art

Actuators of this type are known from motor vehicles as throttle valve controllers, exhaust gas valves or controllers for actuating valves or flaps. The motor shaft is, as a rule, arranged parallel to the shaft that supports the actuating member, in particular the flap. Both shafts are connected to one another via the gear mechanism. The gear mechanism and the electric motor are arranged in each case in separate chambers of the housing. The chambers serve to receive and protect the respective assembly. On account of the different fields of use, different electric motors, gear mechanisms and actuating members are used. Therefore, the housing has to be adapted to the components and installation conditions, in particular in the region of the actuating member. In particular, the different gear mechanism designs cause the cross section of the second chamber and therefore also the cover to vary greatly. This results in a considerable variety of housings, with the result that the housings produced by casting are expensive on account of the low numbers produced per housing shape, which applies in the same way to the cover of the second chamber. Moreover, the respective second chambers and the associated covers have an irregular cross section, for which reason a cover is fastened to the housing by a plurality of screws, the position of the screws likewise varying depending on the actuator.

SUMMARY OF THE INVENTION

In view of the foregoing problems, an object of the invention is to provide an inexpensive actuator.

This object is achieved, in accordance with one aspect of the invention, by providing a second chamber that has a round cross section and that is closed by a round cover, the cover being secured against detachment with respect to the housing by a connection.

The actuator according to an aspect of the invention has a second chamber with a defined cross section, the round cross section making different arrangements of the gear mechanism possible to a certain extent. If the adaptations of the individual housings to the respective installation conditions by way of utilization of the cross section are not sufficient, further adaptations can take place via the selection of the diameter. The variety of housings and therefore the costs can be reduced considerably merely as a result of this. However, the most essential advantage consists in the fact that the cross section permits the connection of the cover and housing by way of only one latching connection. Reliance on a plurality of connecting locations, as has been customary up to now, is no longer required. Manufacturing outlay and assembly outlay are reduced considerably as a result. Moreover, a contribution is made to the considerably simplified and therefore less expensive manufacture by the fact that the housing in the region of the second chamber and the cover have a round cross section.

No additional components are required for the connection if the latching connection is configured between the cover and the housing. Here, a latching location is arranged on one of the two parts, into which latching location a latching hook, which is configured on the other part, engages.

In another advantageous refinement, the latching connection is configured between a ring, which engages partially around the cover, and the housing. In this refinement, the cover is placed onto the second chamber. Securing against detachment takes place by way of the ring which is pushed over the cover, with the result that it engages partially around the latter. The connection is secured by way of latching of the ring to the housing. This refinement has the advantage that, in the case of different requirements made of the latching connection, the entire cover no longer has to be changed, but rather merely the ring is adapted.

Reliable protection of the gear mechanism against environmental influences is achieved if a seal for sealing the second chamber is arranged between the chamber housing and the cover. On account of the circular shape, a seal of this type is substantially less expensive than conventional seals.

In a further advantageous refinement, the second chamber and the cover have structure for positionally correct placing of the cover onto the second chamber. This is advantageous, in particular, when elements such as plugs for contacting the actuator are molded, for example, on the outer side of the cover. Such elements often have to be aligned in a defined orientation with respect to the second chamber or with respect to the housing of the actuator. However, elements of this type can also be supporting elements arranged on the inner side of the cover, such as reinforcements and ribs, or holders for assemblies arranged in the second chamber, such as gear mechanism, position sensor or the like.

BRIEF DESCRIPTION OF THE DRAWINGS

The invention will be explained in greater detail in a plurality of exemplary embodiments. In the drawings.

DETAILED DESCRIPTION OF THE PRESENTLY PREFERRED EMBODIMENTS

Figure 1:
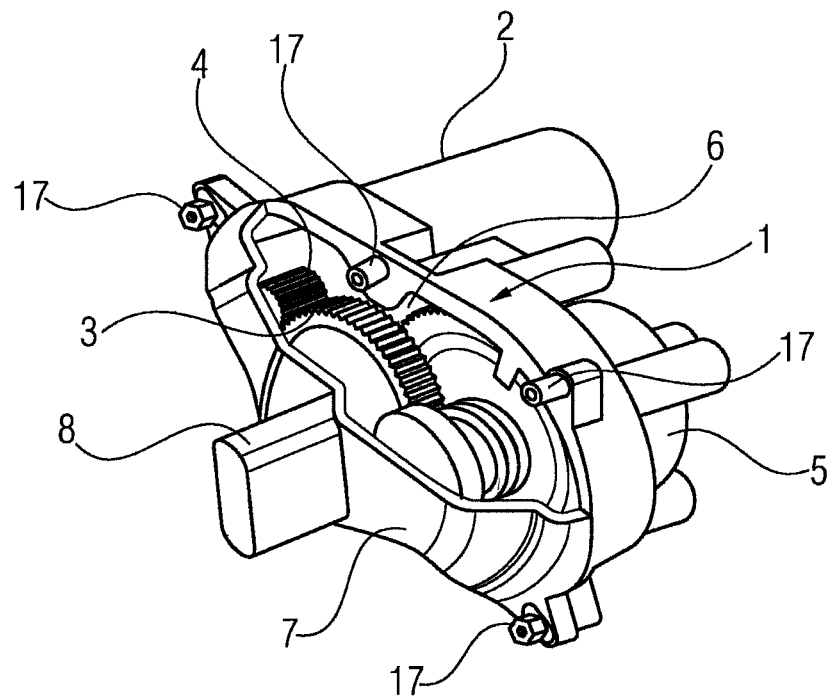
FIG. 1 shows an actuator according to the prior art.

The actuator in FIG. 1 consists of a housing 1, an electric motor arranged in a first chamber 2 of the housing 1, and a gear mechanism 3 connected, on the input side, to a pinion gear 4 arranged on the shaft of the electric motor and, on the output side, to an actuating member 5. The gear mechanism 3 is arranged in a second chamber 6 of the housing 1. The second chamber 6 is closed by a cover 7, which is shown in sectioned form in this view. A plug 8 for contacting the actuator is molded integrally on the cover 7 on the outer side of the cover 7. The axes of symmetry of the electric motor, of the gear mechanism 3 and of the actuating member 5 are arranged approximately in line, with the result that the cover 7 has an elongated configuration. The fastening of the cover 7 to the housing 1 takes place via five screw connections 17.

Figure 2:
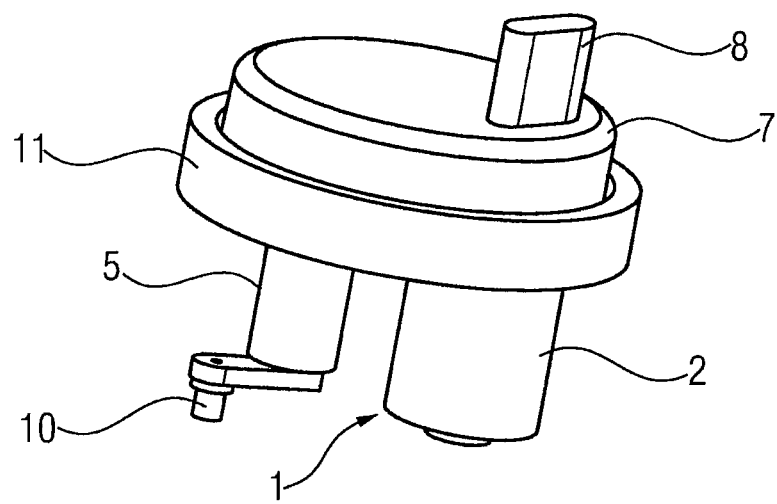
FIG. 2 shows an actuator according to an embodiment of the present invention.

FIG. 2 shows an actuator with the housing 1 that has the first chamber 2 for the electric motor and a third chamber 9 for the actuating member 5. The actuating member 5 has a pivotable pin 10 that can be connected to a flap or a coupling element for a flap. The electric motor and actuating member are connected to one another via a gear mechanism, as in FIG. 1. The gear mechanism is arranged in the second chamber that is closed by the cover 7, by the edge 11 of the cover 7 engaging around the second chamber, with the result that it is not visible in this illustration. The cover 7, and also the second chamber 6, have a round cross section. A plug 8 for contacting the actuator is molded integrally on the cover 7 on the outer side of the cover 7.

Figure 3:
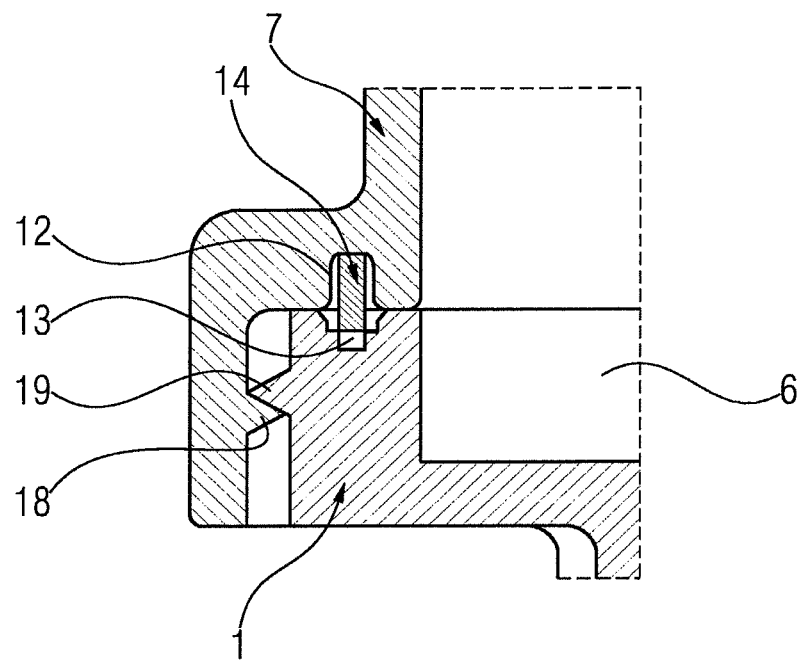
FIGS. 3 and 4 show the seal region of further embodiments of the actuator.

FIG. 3 shows an enlarged illustration of the connecting region of the second chamber 6 to the cover 7. In their surfaces that lie on one another, both the chamber 6 and the cover 7 have, in each case, one groove 12, 13, in which a sealing ring 14 is arranged as a seal. The cover 7 engages around the second chamber 6. In this region, on its inner side, the cover 7 has a radially circumferential latching step 18, whereas a radially circumferential latching location 19 is arranged on the outer side of the second chamber 6. In the assembled state, the latching step 18 and the latching location 19 form a latching connection.

Figure 4:
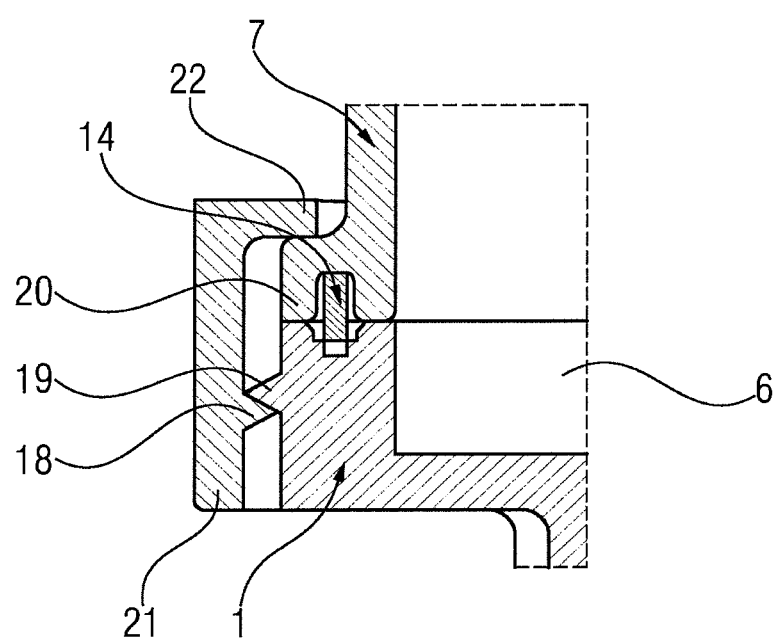

In the third embodiment according to FIG. 4, the second chamber 6 is closed by the cover 7, by the cover 7 lying on the chamber 6. To this end, the cover 7 has a flange 20 configured for contact on the housing 1. A ring 21 is placed onto the cover 7 in such a way that a collar 22, which is configured on the ring 21, engages around the flange 20. A radially circumferential latching step 18 is configured on the inner side of the ring 21, which latching step 18 forms the latching connection together with the radially circumferential latching location 19 on the outer side of the second chamber 6.

Figure 5:
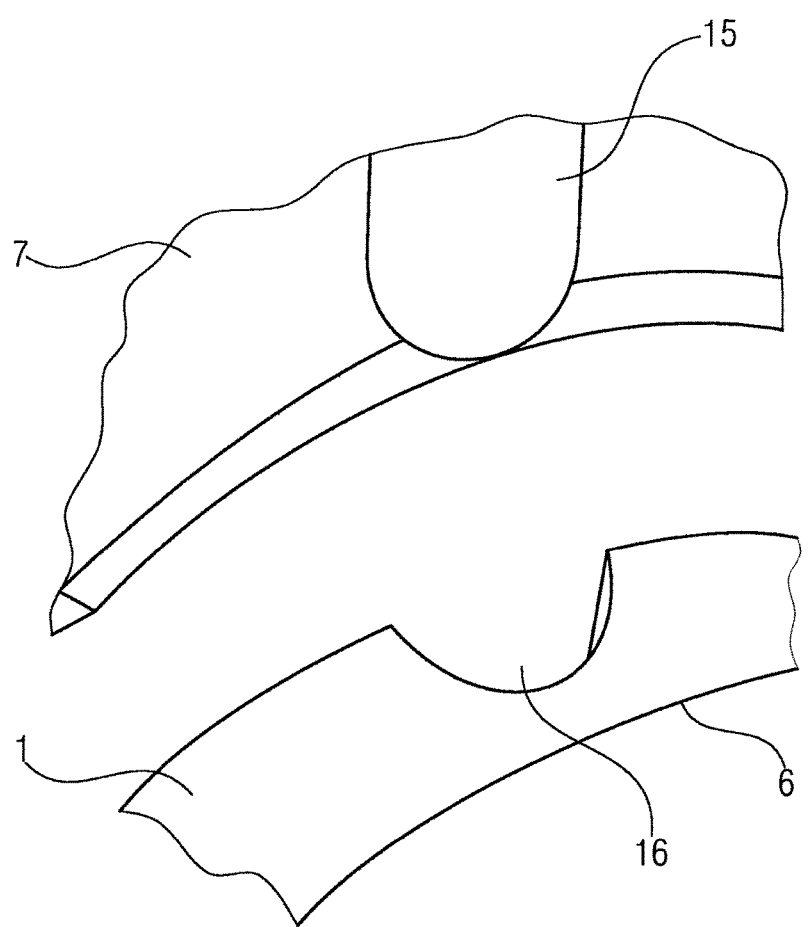
FIG. 5 shows an enlarged illustration of a further embodiment of the present invention.

For positionally correct assembly of the cover 7 with respect to the second chamber 6 and therefore the housing 1, in FIG. 5 the cover 7 has a radially inwardly projecting profiling 15 on its inner side, which profiling 15, in the case of positionally correct assembly, engages into a corresponding, groove-shaped recess 16 on the outer side of the chamber 6 and therefore makes it possible to close the chamber 6 by the cover 7.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An actuator comprising:
   a housing (1), the housing (1) having a first chamber (2) and a second chamber (6);
   an electric motor arranged in the first chamber (2) of the housing (1), the electric motor having a motor shaft;
   an actuating member (5);
   a gear mechanism (3) arranged in the second chamber (6) of the housing (1), the gear mechanism (3) being connected, on an input side of the gear mechanism (3), to the motor shaft of the electric motor, and being connected, on an output side of the gear mechanism (3), to the actuating member (5);
   a latching connection (18, 19);
   a round cover (7) configured to close the second chamber (6) of the housing (1), the round cover (7) being secured against detachment with respect to the housing (1) by the latching connection (18, 19),
   wherein the second chamber (6) has a connecting region at which the second chamber (6) connects with the round cover (7), the connecting region being a region at which a surface of the second chamber (6) and a surface of the round cover (7) lie on one another, and
   wherein in the connecting region, the second chamber (6) has a first partial groove (12) and the round cover (7) has a second partial groove (13), the first partial groove (12) and the second partial groove (13) together forming an aligning groove; and
   the actuator further comprising a sealing ring (14) arranged as a seal located in the aligning groove formed by the first partial groove (12) and the second partial groove (13).

2. The actuator as claimed in claim 1, wherein the latching connection (18, 19) is arranged between the round cover (7) and the housing (1).

3. The actuator as claimed in claim 1, further comprising a ring (21) engaging partially around the round cover (7), wherein the latching connection (18, 19) is arranged between the ring (21) and the housing (1).

4. The actuator as claimed in claim 1, wherein the sealing ring (14) is configured to seal the second chamber (6), the sealing ring (14) being arranged in the aligning groove between the second chamber (6) and the round cover (7).

5. The actuator as claimed in claim 1, wherein the second chamber (6) has a groove shaped recess (16), and the round cover (7) has a profiling (15), the groove shaped recess (16) and the profiling (15) being configured to together provide positionally correct placing of the round cover (7) onto the second chamber (6).

* * * * *